United States Patent [19]
Singbartl

[11] 4,078,185
[45] Mar. 7, 1978

[54] MEASURING SENSING DEVICE

[75] Inventor: Gunther Singbartl, Hannover, Germany

[73] Assignee: WABCO Westinghouse GmbH, Hannover, Germany

[21] Appl. No.: 682,579

[22] Filed: May 3, 1976

[30] Foreign Application Priority Data

May 10, 1975 Germany .............. 2520855

[51] Int. Cl.² ........................................... H02K 19/24
[52] U.S. Cl. ................................................ 310/168
[58] Field of Search .................. 310/168, 155; 324/174

[56] References Cited

U.S. PATENT DOCUMENTS

| | | | |
|---|---|---|---|
| 3,745,392 | 7/1973 | Phoenix et al. | 310/168 |
| 3,769,534 | 10/1973 | Wroblewski et al. | 310/168 |
| 3,774,061 | 11/1973 | Fiteny et al. | 310/168 |
| 3,793,545 | 2/1974 | Leiber et al. | 310/168 |
| 3,887,046 | 6/1975 | Bueler | 310/168 X |
| 3,890,517 | 6/1975 | Marsh et al. | 310/168 |
| 3,928,802 | 12/1975 | Reinecke | 324/174 |

Primary Examiner—Donovan F. Duggan
Attorney, Agent, or Firm—R. S. Visk; R. W. McIntire, Jr.

[57] ABSTRACT

A measuring sensing device for generating a signal corresponding to the relative rotation between two construction parts, with a rotor arranged on the rotating construction part and a stator borne on the fixed construction part, the stator being supported by one or more clamping bodies on the fixed construction part in such a way that on overcoming a considerable frictional adhesion it is slidable with respect to the fixed construction part.

6 Claims, 4 Drawing Figures

MEASURING SENSING DEVICE

BACKGROUND OF THE INVENTION

Measuring sensing devices of this type are used everywhere where the rotary behavior of two construction parts turning with respect to one another is to be determined and there is to be delivered a signal corresponding to the relative rotation. In order to obtain as strong as possible an output signal it is necessary to make the space between the pole shoe of the stator and the rotor very close.

It is a known practice to apply to the pole shoe a plastic layer which in the assembling of process of the stator acts as a spacer disk between rotor and stator, but which, upon setting the measuring sensing device in operation is shaved off from the rotor (which consists of a gear disk), so that an air gap is formed between the pole shoe of the stator and the rotor. Through the shaving off of the plastic layer, however, abrasion particles can foul the measuring sensing arrangements and render it incapable of functioning.

A further known measuring sensing device is characterized in that the stator is supported by elastic spreading or clamping bodies on the fixed construction part in such a way that through relative displacement between rotor and stator after completed adjustment of the stator to a minimimal air gap in the assembling only a shifting of the stator in the sense of an increase of the air gap is possible on overcoming a considerable frictional adhesion (DAS 2,111,499).

This measuring sensing device is disadvantageous that an exact setting of the air gap between stator and rotor is not possible, since in the assembling process, the stator and rotor have to come into engagement reciprocably, and not until setting in operation of the measuring sensing device and the turning of the rotor is the stator shifted away from the rotor by an unpredictable amount.

SUMMARY OF THE INVENTION

Underlying the invention is the problem of providing a measuring sensing device of the type described at the outset, in which the desired air gap between stator and rotor is predeterminable in a simple manner and is automatically settable, without contact taking place between stator and rotor when the device is placed in operation.

The problem is solved, according to the invention, in that the stator is held by a spring element acting in and axial direction, which entirely or partially surrounds the stator in such a manner on the fixed construction part or in a connection casing fastened to the fixed construction part, that after biasing the stator into the fixed construction part or connection casing up to a stop contact with the rotor, upon overcoming a considerable frictional adhesion between wall of the stator and spring element, and with elastic deformation of the spring element, the stator is set back from the spring element by the amount of the elastic deformation of the spring element, in which process the amount of the elastic deformation determines the size of the desired air grap.

The arrangement according to the invention makes it possible, by special construction of the spring element and/or the choice of differing materials for making the spring element, in a simple manner to determine the air gap between stator and rotor. During the assembling process, therefore it is no longer necessary to use aids, such as, for example, spacing pieces or sensing gauges, in order to establish a desired air gap. A further advantage of the arrangement of the invention lies in the simple and accurate adjustability of the measuring sensing device. The stator, for this purpose, is merely pressed again up to the stop (contact with the rotor) in the fixed construction part. By means of the spring element it is then automatically set back by the predetermined amount, so that the desired air gap is restored.

The spring element can advantageously be constructed as a simple elastic annular disk, as an annular elastic body with an annular disk worked into this, having a smaller inside diameter than the elastic body, or also as an elastic annular body with a plate-type annular disk resting thereon and overlapping it.

According to a further feature of the invention the spring element is positionally retained by means of a force member which consists preferably of a simple cylindrical pressure spring, the force member being of such compression rating that the pressure exerted on the spring element is less than the force of the frictional adhesion between stator wall and spring element and the restoring force of the spring element. Thereby it is assured that the stator will always return to its predetermined position with respect to the rotor if, for example, in the assembling or disassembling of the wheel or in the installation and removal of the axle it is displaced counter to the pressing-in direction. Through the arrangement of a force member for positionally retaining the spring element, there is further yielded the advantage that the spring element does not have to be anchored in the fixed construction part or pressed into it.

It is just as advantageous to install the stator in a connection casing to be attached to the fixed construction part for effecting automatic resetting of the stator in similar manner as when fixed in construction part.

A further characteristic of the invention, whether disposed on the fixed construction part or in the connection casing, the spring element is provided with a stop by which the path of the elastic deformation of the spring element is limited. The stop can consist of the part of the plate-type disk overlapping the elastic annular body or a ledge in the fixed construction part or stop casing. It is also possible to construct the bottom of the connection casing or the bore in the fixed construction part that serves to receive the stator in funnel form in its end zone, so that the depth of the funnel determines the path of the elastic deformation of the spring element.

BRIEF DESCRIPTION OF THE DRAWINGS

An example of execution of the object of invention is explained in detail below with the aid of the drawings in which:

In FIGS. 2, 3 and 4 the stator and the spring element are provided with reference numerals each raised by 100 with respect to the same parts shown in FIG. 1.

In FIG. 1 there is borne on an axial piece or vehicle axle 1, by means of conical roller bearings 2 and 3, a wheel hub 4 of a vehicle wheel (not represented). The wheel hub 4 has an offset 5, which serves as a seat for a rotor 6, consisting of a radially geared ring. On a brake carrier or apparatus 7 there is fastened a cropped arm 8, which is solidly joined with a part of a connection casing 9 which receives a stator 10 vertically disposed relative to said brake carrier. The connection casing 9 consists of a metal or plastic shell 11, which on the lower end thereof, as viewed in FIG. 1, is provided with a peripheral radially inwardly directed flange or base 12 while the opposite end is closed by an annular cover 13. The cover 13 has an offset 14 which is overlapped by the sleeve 11. According to the invention, a spring element 15, in the form of an elastic annular convex-concave disk or washer, rests on the flange 12 at the bottom of the casing 9. The outer diameter of spring washer 15 is smaller than the inner diameter of casing 11 in order to allow said annular spring to rest on the flange 12 but to also make possible a deforming of the inner central area of said spring washer into the circular opening of said flange. Through the force of a helical pressure spring 16 having one end abutting against the casing cover 13, the spring element 15 is biased against flange 12. In the casing cover 13 an annular groove 17 is provided to receive a plastic or rubber bearing ring 18, which serves as a bearing member for the end of stator 10 disposed in the adjacent end of the connection casing 9 and whose special function is to dampen vibrations between stator 10 and casing 9.

Figure 1:
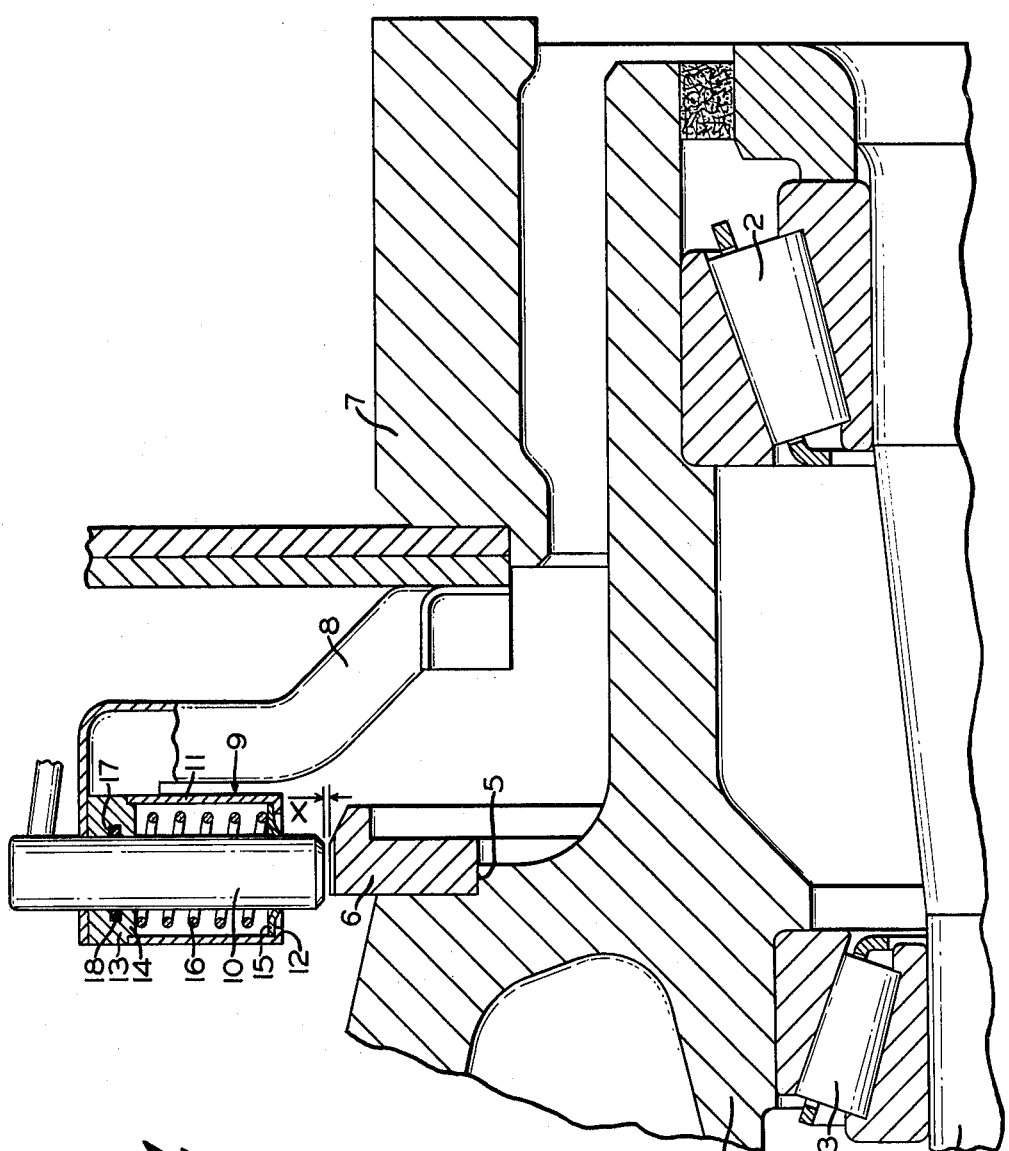
FIG. 1 shows the support of the stator in a connection casing which is fastened to the brake-carrier of a vehicle, as well as the arrangement of the rotor on a wheel hub, the stator being arranged radially relative to the rotor.

The automatic setting of stator 10 to a predetermined axial position in which a desired air gap between rotor 6 and pole shoe of the stator 10 is provided, is achieved by biasing or axial movement of the stator 10 into the connection casing 9 and thereby also into the spring element 15 (annular disk). The diameter of the central opening of spring element 15 is selected, and the convex-concave surfaces are directed such that the stator 10 can be moved axially downwardly only upon overcoming a predetermined frictional adhesion between said stator and spring element 15, whereupon the inner central area of said spring element is deformed downwardly into a funnel shape and extended by an amount X, as shown in FIG. 1. After completion of downward axial movement of stator 10, spring element 15, because of its elastic nature, returns to its original form and shape, and in so doing effects upward axial movement of stator 10 by the amount X of the elastic deformation.

Figure 2:
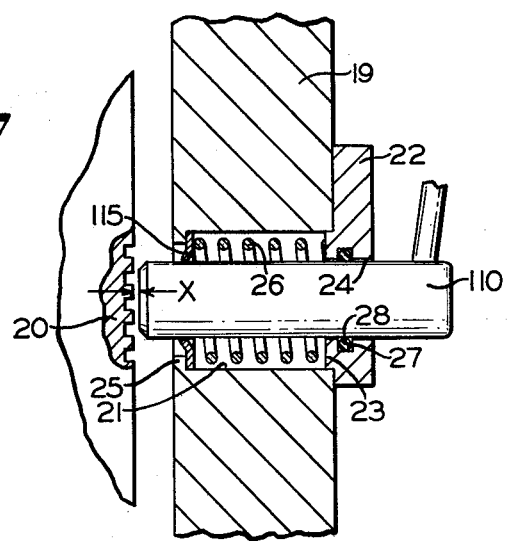
FIG. 2 shows the support of the stator in a step bore provided in the brake carrier, and a cutout of the rotor. Rotor and stator in this example of execution are arranged in axial relation to each other.

A readjusting of the stator 10 possibly becoming necessary at a later point of time, is accomplished in a simple manner by a repeated pressing-in or downward axial movement of the stator 10 from an initial axial position to a stop position in contact with rotor 6 and subsequent resetting of the stator through the action of spring element 15 (by the amount of the elastic deformation thereof) in resuming its normal original shape and position. In the embodiment according to FIG. 2, a stator 110 is horizontally disposed in a brake carrier 19 opposite a rotor 20, only a portion of which is shown. Formed in brake carrier 19 is a stepped bore 21, which is closed off on the end opposite rotor 20 by a cover 22. The cover 22 has an offset 23 engaging into bore 21, said cover having a bore 24 formed therein coaxially with said bore 21. At the end of bore 21 adjacent rotor 20, there is formed an internal shoulder 25 against which a washer-form spring element 115 rests. A helical pressure spring 26 having one end abutting on the offset 23 of the cover 22 acts to bias spring element 115 against shoulder 25. Cover 22 is provided with an internal annular groove 27 in which is disposed a rubber ring 28 that has the function of damping vibrations between stator 110 and bore 21 (which, in this case serves as the casing).

Setting of stator 110 to provide a certain air gap between rotor 20 and stator 110 is accomplished in this embodiment of the invention by pressing the stator 110 into bore 21 forming the casing until abutting contact is made with rotor 20 and subsequent rightward axial movement of the stator by an amount X, as effected by said spring element due to the elastic nature thereof, as above described.

Figure 3:
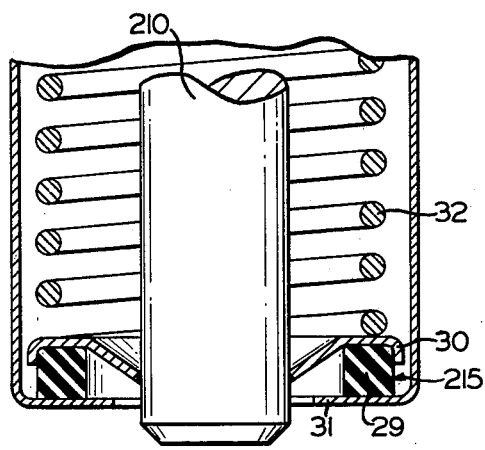
FIGS. 3 and 4 show special forms of execution of the spring element as well as the bearing of the spring element in the connection casing.
Figure 4:
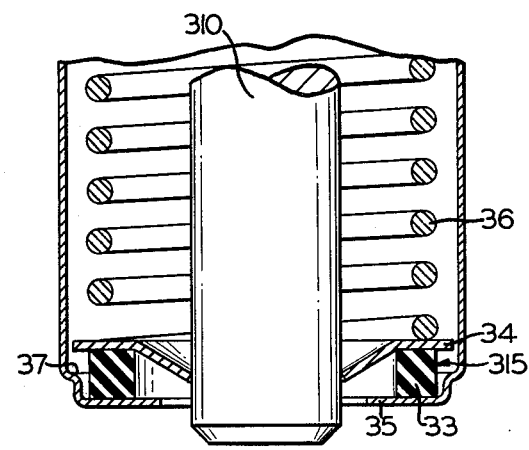

FIGS. 3 and 4 show special forms of execution of the spring element and their arrangement in the casing. According to FIG. 3, a spring assemblage 215 consists of an annular rubber member 29 having a square cross section with an annular convex-concave disk 30 resting thereon and overlapping the rubber member. Spring assemblage 215 is supported on an inwardly turned bottom flange portion 31 of a casing and is held by a helical pressure spring 32 which abuts at its upper end against a cover (not shown) of the casing. In the assembling process, a stator 210 is pressed into the casing until the pole shoe of the stator contacts the rotor (not shown). The inside diameter of the annular disk 30 is chosen in such a way that the stator 210 can be pressed in only by overcoming a considerable frictional adhesion between the stator and disk 30. Since, in order to overcome the frictional adhesion between stator 210 and annular disk 30, a greater force is necessary than needed for deforming the rubber member 29, such deforming of member 29 is effected by disk 30 when stator 210 is pressed into the casing. After completion of the pressing-in operation the rubber member 29, because of the elasticity of the material, regains its original form and in so doing shifts the annular disk 30 with the stator 210 counter to the pressing-in direction by the amount of the elastic deformation of the rubber body 29.

A downwardly directed outer peripheral skirt portion of disk 30 overhangs the rubber member 29 and serves as a stop for limiting downward axial displacement of said disk by contacting bottom flange 31.

A stator 310 shown in FIG. 4 cooperates with a spring assemblage 315 which is essentially constructed similarly to spring assemblage 215 represented in FIG. 3. An annular rubber member 33, also of square cross-sectional area, has resting thereon an annular convex-concave disk 34 whose outer diameter is greater than that of the rubber member. Spring assemblage 315 is supported on a bottom flange 35 of a cylindrical casing provided with a circular opening through which a stator 310 is coaxially movable. By means of a helical pressure spring 36 which abuts at its upper end against the cover (not shown) of the casing, spring assemblage 315 is held in position. The casing is provided with a shoulder 37 adjacent flange 35. Shoulder 37 serves as stop for the annular disk 34, so that when stator 310 is pressed downwardly, said shoulder limits the downward axial displacement of said annular disk.

The distance between shoulder 37 and annular disk 34 is thereby equal to the distance between the rotor (not shown here) and the pole shoe of stator 310.

I claim:

1. A measuring sensing device for generating a signal corresponding to the relative rotation between a rotating portion and a stationary portion of an apparatus, a rotor rotatable with said rotating portion, an axially displaceable stator supported on the stationary portion axially normal to the axis of said rotor and normally axially spaced apart from said rotor with an axial gap of predetermined distance therebetween, and wherein the improvement comprises a spring assemblage including a resilient axially deformable washer type spring element coaxially surrounding the stator for providing a predetermined degree of frictional adhesion therebetween, said stator being axially displaceable relative to said spring element out of an initial axial position by an actuating force sufficient for overcoming said frictional adhesion, in one direction to a stop position in abutting contact with said rotor and in which stop position said spring element is resiliently axially deformed out of a normal shape an amount corresponding to the amount of axial displacement of the stator, said spring element being effective, upon release of said actuating force and consequent return of the spring element to its normal shape, for locking onto said stator and causing axial movement in unison with each other in a direction opposite to said one direction to a predetermined axial position in which an axial gap of predetermined length is provided between the rotor and the stator as determined by the amount of axial movement of the stator in said opposite direction effected by return of the spring element to its said normal shape.

2. A measuring sensing device according to claim 1, wherein said spring element is of convex-concave form disposed such as to permit axial movement of the stator therethrough in said one direction and for locking onto the stator for effecting said axial movement thereof in said opposite direction.

3. A measuring sensing device according to claim 1, wherein the spring assemblage further comprises a resilient annular fixed member on which said spring element coaxially rests, said annular fixed member being yieldable to said actuating force for effecting said axial movement of said stator in said one and said opposite directions.

4. A measuring sensing device according to claim 3, wherein the spring element comprises an elastic washer type member having an annular peripheral skirt overhanging the outer periphery of said annular fixed member.

5. A measuring sensing device according to claim 1, characterized by a pressure spring for axially biasing the spring element in a direction corresponding to said one direction and retaining said spring element in a normal axial position relative to 6. A measuring sensing device according to claim 5 wherein the force exerted by said pressure spring on the spring element is less than said actuating force necessary for overcoming the frictional adhesion between said stator and the spring element.

* * * * *

UNITED STATES PATENT AND TRADEMARK OFFICE
CERTIFICATE OF CORRECTION

PATENT NO. : 4,078,185

DATED : March 7, 1978

INVENTOR(S) : Gunther Singbartl

It is certified that error appears in the above-identified patent and that said Letters Patent are hereby corrected as shown below:

Column 6, line 23, after "to" insert --said stator.--

*Signed and Sealed this*

*Twenty-second* Day of *August 1978*

[SEAL]

Attest:

RUTH C. MASON
*Attesting Officer*

DONALD W. BANNER
*Commissioner of Patents and Trademarks*